(12) United States Patent
Shao et al.

(10) Patent No.: US 11,867,548 B2
(45) Date of Patent: Jan. 9, 2024

(54) METHODS, INTERNET OF THINGS SYSTEMS, AND MEDIUMS FOR CORRECTING SMART GAS FLOW

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/186,978

(22) Filed: Mar. 21, 2023

(65) Prior Publication Data

US 2023/0228608 A1 Jul. 20, 2023

(30) Foreign Application Priority Data

Feb. 10, 2023 (CN) .......................... 202310095073.2

(51) Int. Cl.
*G01F 15/063* (2022.01)
*G16Y 40/35* (2020.01)
(Continued)

(52) U.S. Cl.
CPC ............ *G01F 15/063* (2013.01); *G16Y 10/35* (2020.01); *G16Y 20/30* (2020.01); *G16Y 40/35* (2020.01)

(58) Field of Classification Search
CPC ....... G01F 15/063; G01F 25/10; G16Y 10/35; G16Y 20/30; G16Y 40/35
See application file for complete search history.

(56) References Cited

U.S. PATENT DOCUMENTS

| 9,024,767 B2 * | 5/2015 | Ramsay .................... G01F 1/66 340/506 |
| 11,391,615 B2 * | 7/2022 | Appel .................... G06Q 10/20 |

(Continued)

FOREIGN PATENT DOCUMENTS

| CN | 107557083 A | 2/2018 |
| CN | 107655549 A | 2/2018 |

(Continued)

OTHER PUBLICATIONS

First Office Action in Chinese Application No. 202310095073.2 dated Mar. 14, 2023, 15 pages.

(Continued)

*Primary Examiner* — Albert K Wong
(74) *Attorney, Agent, or Firm* — METIS IP LLC

(57) ABSTRACT

The present disclosure provides methods, Internet of Things (IoT) systems, and mediums for correcting a smart gas flow. The method may be implemented by a smart gas device management platform of an IoT system for correcting a smart gas flow. The method may include: obtaining reading data of a gas meter; determining a first confidence level of the reading data based on the reading data; in response to a determination that the first confidence level is smaller than a confidence level threshold, obtaining a working condition parameter; and determining, based on the working condition parameter, a gas meter correction mode.

7 Claims, 7 Drawing Sheets

(51) Int. Cl.
*G16Y 20/30* (2020.01)
*G16Y 10/35* (2020.01)

(56) References Cited

U.S. PATENT DOCUMENTS

| | | | | |
|---|---|---|---|---|
| 11,556,740 | B2* | 1/2023 | DeLuca | G06N 20/00 |
| 11,663,290 | B2* | 5/2023 | Vishwakarma | H04W 84/18 |
| | | | | 370/329 |
| 2003/0005747 | A1 | 1/2003 | van der Geest et al. | |
| 2009/0266139 | A1 | 10/2009 | Gregor et al. | |
| 2023/0213370 | A1* | 7/2023 | Shao | G01F 25/15 |
| | | | | 73/272 A |
| 2023/0213912 | A1* | 7/2023 | Shao | G06Q 50/06 |
| | | | | 700/28 |
| 2023/0221207 | A1* | 7/2023 | Shao | G06N 20/00 |
| | | | | 73/592 |

FOREIGN PATENT DOCUMENTS

| | | |
|---|---|---|
| CN | 108072428 A | 5/2018 |
| CN | 109682435 A | 4/2019 |
| CN | 109781200 A | 5/2019 |
| CN | 112033479 A | 12/2020 |
| CN | 112534215 A | 3/2021 |
| CN | 112805541 A | 5/2021 |
| CN | 113899431 A | 1/2022 |
| CN | 114923547 A | 6/2022 |
| CN | 114706712 A | 7/2022 |
| CN | 115326026 A | 11/2022 |
| EP | 1464929 A2 | 10/2004 |
| WO | 2013092245 A1 | 5/2013 |

OTHER PUBLICATIONS

Notification to Grant Patent Right for Invention in Chinese Application No. 202310095073.2 dated Apr. 3, 2023, 2 pages.
Wang, Hongye et al., Research on Fast Response Method of Multi-channel Signal Acquisition and Measurement, Chemical Automation and Instrumentation, 2022, 12 pages.

* cited by examiner

400

```
┌─────────────────────────────────────────────────────────┐
│ Predicting, based on the first reading data, a          │  ╱410
│ distribution interval of third reading data and a       │
│ distribution probability corresponding to the third     │
│ reading data                                            │
└─────────────────────────────────────────────────────────┘
                            │
                            ▼
┌─────────────────────────────────────────────────────────┐
│ Taking a distribution probability corresponding to the  │  ╱420
│ second reading data in the distribution interval of the │
│ third reading data as the first confidence level        │
└─────────────────────────────────────────────────────────┘
```

FIG. 4

METHODS, INTERNET OF THINGS SYSTEMS, AND MEDIUMS FOR CORRECTING SMART GAS FLOW

CROSS-REFERENCE TO RELATED APPLICATION

This application claims priority of Chinese Patent Application No. 202310095073.2, filed on Feb. 10, 2023, the contents of which are entirely incorporated herein by reference.

TECHNICAL FIELD

The present disclosure relates to the field of a gas device correction, and in particular, to methods, Internet of Things (IoT) systems, and mediums for correcting a smart gas flow.

BACKGROUND

When the gas meter is measuring a gas flow, errors may occur due to use of the gas meter under a non-standard temperature or pressure condition, so that a reading of the gas meter cannot reflect a real volume or flow of gas. Therefore, it is desirable to provide a method for correcting a gas flow, which can realize an intelligent temperature and pressure compensation for the reading of the gas meter or an intelligent replacement of the gas meter.

SUMMARY

One or more embodiments of the present disclosure provide a method for correcting a smart gas flow. The method may be implemented by a smart gas device management platform of an Internet of Things (IoT) system for correcting a smart gas flow. The method may include: obtaining reading data of a gas meter; determining a first confidence level of the reading data based on the reading data; in response to a determination that the first confidence level is smaller than a confidence level threshold, obtaining a working condition parameter; and determining, based on the working condition parameter, a gas meter correction mode.

One or more embodiments of the present disclosure provide an Internet of Things (IoT) system for correcting a smart gas flow. The IoT system may include a smart gas user platform, a smart gas service platform, a smart gas device management platform, a smart gas sensor network platform, and a smart gas object platform. The smart gas device management platform may be configured to: obtain reading data of a gas meter; determine a first confidence level of the reading data based on the reading data; in response to a determination that the first confidence level is smaller than a confidence level threshold, obtaining a working condition parameter; and determine, based on the working condition parameter, a gas meter correction mode.

One or more embodiments of the present disclosure provide a non-transitory computer-readable storage medium storing computer instructions. When reading the computer instructions in the storage medium, a computer may implement the method for correcting a smart gas flow.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 4 is a flowchart illustrating an exemplary process for determining a first confidence level according to some embodiments of the present disclosure;

DETAILED DESCRIPTION

Figure 1:
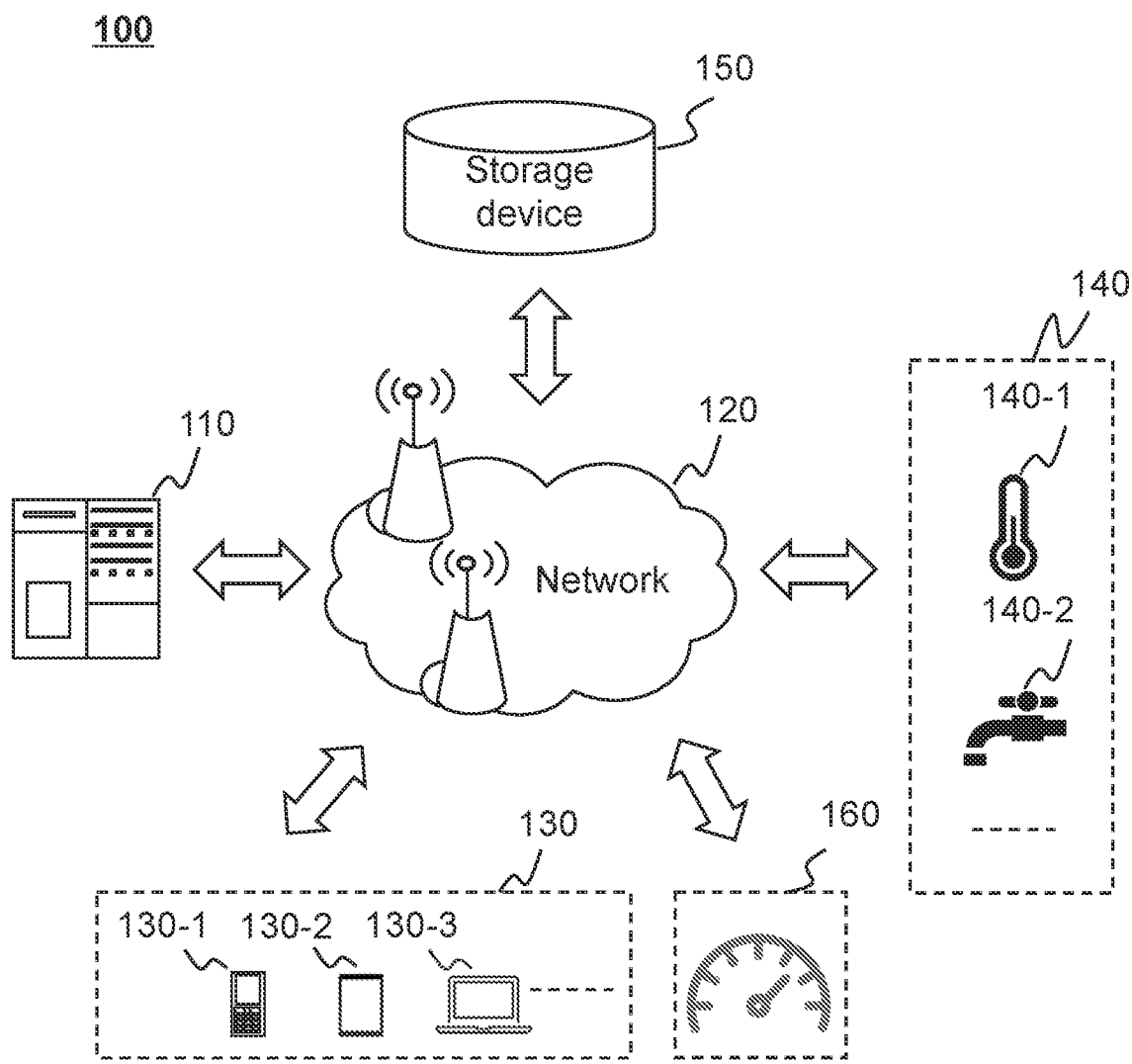
FIG. 1 is a schematic diagram illustrating an exemplary application scenario of an Internet of Things (IoT) system for correcting a smart gas flow according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary application scenario of an Internet of Things (IoT) system for correcting a smart gas flow according to some embodiments of the present disclosure.

As shown in FIG. 1, an application scenario 100 may include a server 110, a network 120, a terminal device 130, a monitoring device 140, a storage device 150, and a gas meter 160.

In some embodiments, the application scenario 100 may determine a smart gas flow correction solution by implementing a method and/or the IoT system for correcting a smart gas flow disclosed in the present disclosure. For example, in a typical application scenario, the IoT system for correcting a smart gas flow may obtain reading data of the gas meter through a third-party platform or the gas meter 160. The server 110 (a processing device) may determine a first confidence level of the reading data based on the reading data; in response to a determination that the first confidence level is smaller than a confidence level threshold, obtain a working condition parameter; and determine, based on the working condition parameter, a gas meter correction mode. For more description about the above process, please refer to FIG. 3 and related description thereof.

The server 110 may be connected with the terminal device 130 through the network 120, and the server 110 may be connected with the storage device 150 through the network 120. The server 110 may include a processing device, and the processing device may be configured to execute the method for correcting the smart gas flow described in some embodiments of the present disclosure. The network 120 may connect various components of the application scenario 100 and/or connect the system and external resource parts. The storage device 150 may be configured to store data and/or instructions, for example, the storage device 150 may store the reading data of the gas meter, the first confidence level, the working condition parameter, and the gas meter correction mode, etc. The storage device 150 may be directly connected to the server 110 or may be arranged inside the server 110. The terminal device 130 refers to one or more terminal devices or software. In some embodiments, the terminal device 130 may receive information related to the gas meter correction manner sent by the processing device, and display the information to a user. In some embodiments, the terminal device 130 may be configured to input confirmation information related to the method for correcting the smart gas flow by the user, and send the confirmation information to the server 110. Exemplarily, the terminal device 130 may include a mobile device 130-1, a tablet computer 130-2, a laptop computer 130-3, other devices with input and/or output functions, or any combination thereof. The monitoring device 140 may be configured to obtain the working condition parameter. An exemplary monitoring device 140 may include a temperature sensor 140-1, a pressure sensor 140-2, a camera, a harmful gas sensing device, etc. In some scenarios, the application scenario of the IoT system for correcting a smart gas flow may not include the monitoring device 140, and may directly obtain the working condition parameter from the third-party platform. The gas meter 160 may be configured to obtain the reading data. The reading data may include current reading data and historical reading data. The gas meter may be a device configured to meter the gas flow. For example, the gas meter may include a turbine gas flow meter, a diaphragm gas meter, a roots gas flow meter, etc. In some embodiments, the gas meter 160 may send the obtained reading data to other assemblies (such as the server 110, the terminal device 130, or the storage device 150, etc.) through the network 120.

It should be noted that the application scenario 100 is provided for the purpose of illustration, and not intended to limit the scope of the present disclosure. For those skilled in the art, various modifications or changes may be made based on the description of the present disclosure. For example, the application scenario 100 may further include a database. As another example, the application scenario 100 may be implemented on other devices to achieve similar or different functions. However, these changes and modifications do not depart from the scope of the present disclosure.

The IoT system may be an information processing system that includes some or all of a user platform, a service platform, a management platform, a sensor network platform, and an object platform. The user platform may be a functional platform configured to obtain user perceptual information and generates control information. The service platform may be configured to connect the management platform and the user platform, and play functions of perceptual information service communication and control information service communication. The management platform may be configured to overall plan and coordinate connection and cooperation between various functional platforms (e.g., the user platform and the service platform). The management platform may be configured to gather the information of the IoT operation system and may provide functions of perception management and control management for the IoT operation system. The sensor network platform may be configured to connect the management platform and the object platform, and play functions of perceptual information sensor communication and control information sensor communication. The object platform may be a functional platform configured to generate perceptual information.

The processing of information in the IoT system may be divided into a processing process of the user perceptual information and a processing process of the control information. The control information may be information generated based on the user perceptual information. In some embodiments, the control information may include user demand control information, and the user perceptual information may include user query information. The processing of the perceptual information may be that the object platform obtains the perceptual information and transmits the perceptual information to the management platform through the sensor network platform. The user demand control information may be transmitted by the management platform to the user platform through the service platform, thereby realizing control of sending prompt information.

Figure 2:
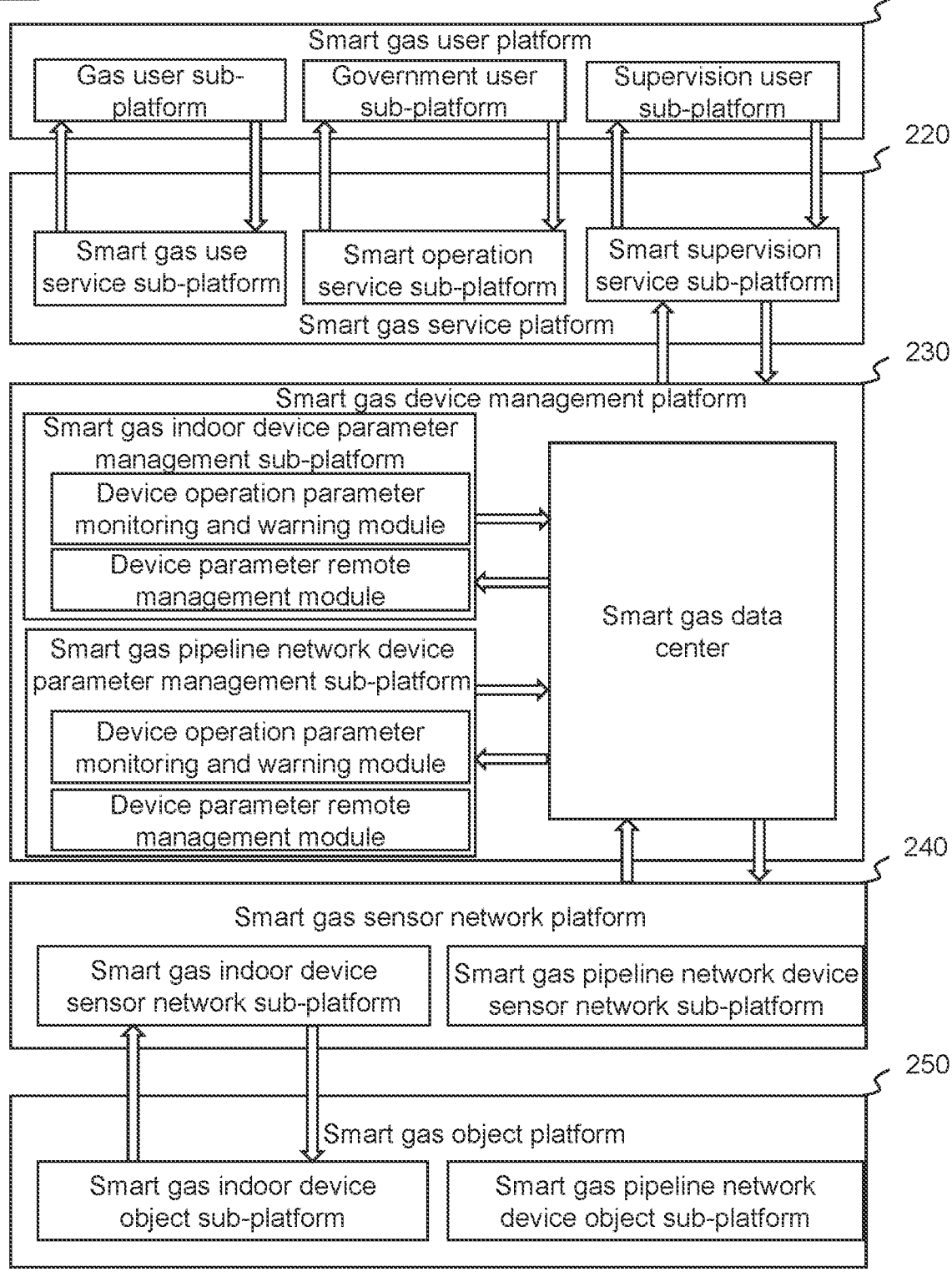
FIG. 2 is a block diagram illustrating an exemplary IoT system for correcting a smart gas flow according to some embodiments of the present disclosure.

FIG. 2 is a block diagram illustrating an exemplary IoT system for correcting a smart gas flow according to some embodiments of the present disclosure.

As shown in FIG. 2, the IoT system 200 for correcting a smart gas flow may include a smart gas user platform 210, a smart gas service platform 220, a smart gas device management platform 230, a smart gas sensor network platform 240, and a smart gas object platform 250. In some embodiments, the IoT system 200 for correcting a smart gas flow may be a part of a server or may be implemented by the server.

In some embodiments, the IoT system 200 for correcting a smart gas flow may be applied to various scenarios of a terminal management. In some embodiments, the IoT system 200 for correcting a smart gas flow may obtain reading data of a gas meter; determine a first confidence level of the reading data based on the reading data; in response to a determination that the first confidence level is smaller than a confidence level threshold, obtain a working condition parameter; and determine, based on the working condition parameter, a gas meter correction mode.

Various scenarios of the IoT system 200 for correcting a smart gas flow may include a gas user use scenario, a government user use scenario, a supervision user use scenario, etc. It should be noted that the above scenarios are only examples, and do not limit the specific application scenarios of the IoT system 200 for correcting a smart gas flow. Those skilled in the art may apply the IoT system 200 for correcting a smart gas flow to any other suitable scenarios on the basis of the descriptions disclosed in the embodiment.

The smart gas user platform 210 may be a user-oriented platform that obtains a user demand and feeds back information to the user. In some embodiments, the smart gas user platform 210 may interact with the user. In some embodiments, the smart gas user platform 210 may be configured as a terminal device, for example, a smart device such as a mobile phone, a computer, etc.

In some embodiments, the smart gas user platform 210 may include a gas user sub-platform, a government user sub-platform, and a supervision user sub-platform. The gas user may receive information related to gas meter reading data and gas meter correction manner sent by the smart gas service platform 220 through the gas user sub-platform. The gas user may further interact with the smart gas service platform 220 to send confirmation information related to a smart gas flow correction solution. The government user may obtain a gas operation service of the smart gas service platform 220 through the government user sub-platform. The supervision user may send a query instruction or a control instruction for the gas meter reading data and the gas meter correction manner to the smart gas service platform 220 through the supervision user sub-platform, and obtain the gas meter reading data, the gas meter correction mode, the working condition parameter, etc. The gas user may be a user of a gas device. The government user may be a government manager related to an activity such as a gas facility protection, a gas safety accident prevention and handling, a gas operation management, etc. The supervision user may be a manager or a government officer who performs a safety monitoring on the gas device and the gas metering system. In some embodiments, the smart gas user platform 210 may obtain the instruction input by the user through the terminal device, and query information related to the gas meter reading data and the gas meter correction mode. In some embodiments, the smart gas user platform 210 may obtain the user's confirmation information related to the gas meter reading data and the gas meter correction manner through the terminal device.

The smart gas service platform 220 may be a platform that provides information/data transmission and interaction.

In some embodiments, the smart gas service platform 220 may be configured for the information and/or data interaction between the smart gas device management platform 230 and the smart gas user platform 210. For example, the smart gas service platform 220 may receive the query instruction sent by the smart gas user platform 210 for storage, and then send the query instruction to the smart gas device management platform 230, and further obtain the information related to the gas meter reading data and the gas meter correction manner from the smart gas device management platform 230 for storage, and then send the information to the smart gas device management platform 230. As another example, the smart gas service platform 220 may send the gas meter reading data and the gas meter correction manner to the smart gas user platform 210, and obtain the confirmation information related to the gas meter reading data and the gas meter correction manner from the user platform 210 for storage, and then send the information to the smart gas device management platform 230.

In some embodiments, the smart gas service platform 220 may include a smart gas use service sub-platform, a smart operation service sub-platform, and a smart supervision service sub-platform. In some embodiments, the smart gas service sub-platform may be configured to receive the information related to the gas meter reading data and the gas meter correction manner sent by the smart gas device management platform 230, and send the information to the gas user platform. In some embodiments, the smart supervision service sub-platform may be configured to receive the query instruction sent by the government user sub-platform, and send the query instruction to the smart gas device management platform 230. In some embodiments, the smart supervision service sub-platform may be configured to receive the control instruction sent by the supervision user sub-platform, and send the control instruction to the smart gas device management platform 230.

The smart gas device management platform 230 may refer to an IoT platform configured to overall plan and coordinate the connection and cooperation between various functional platforms, and provide functions of perception management and control management.

In some embodiments, the smart gas device management platform 230 may be configured for information and/or data processing. For example, the smart gas device management platform 230 may be configured for monitoring and warning of the device working condition parameter and remote management of device parameter.

In some embodiments, the smart gas device management platform 230 may be further configured for information and/or data interaction between the smart gas service platform 220 and the smart gas sensor network platform 240. For example, the smart gas device management platform 230 may receive the query instruction sent by the smart gas service platform 220 (such as the smart supervision service sub-platform) for storage, and then send the query instruction to the smart gas sensor network platform 240, and may obtain information related to an open or closed state of a smart gas terminal from the smart gas sensor network platform 240 for storage, and then send the information to the smart gas service platform 220. As another example, the smart gas device management platform 230 may send the information related to the gas meter reading data and the gas meter correction manner to the smart gas service platform 220 (such as the smart gas use service sub-platform), obtain the conformation information related to the gas meter reading data and the gas meter correction mode, process the conformation information, and then send the conformation information to the smart gas sensor network platform 240.

In some embodiments, the smart gas device management platform 230 may include a smart gas indoor device parameter management sub-platform, a smart gas pipeline network device parameter management sub-platform, and a smart gas data center.

The smart gas indoor device parameter management sub-platform may be configured for the remote management and parameter monitoring and warning of a smart gas indoor device. In some embodiments, the smart gas indoor device parameter management sub-platform may include a device operation parameter monitoring and warning module and a device parameter remote management module.

The smart gas pipeline network device parameter management sub-platform may be configured for remote management and parameter monitoring and warning of a smart gas pipeline network device. In some embodiments, the smart gas pipeline network device parameter management sub-platform may include a device operation parameter monitoring and warning module and a device parameter remote management module.

The smart gas data center may be a data management sub-platform for storing, calling, and transferring data. The smart gas data center may store historical data, for example, historical reading data, a historical gas meter correction mode, etc. The above data may be obtained through manual input or historical execution of the method. In some embodiments, the smart gas data center may be configured to send the gas meter reading data and the gas meter correction manner to the smart gas service platform 220.

In some embodiments, the smart gas device management platform 230 may be configured to obtain the reading data of the gas meter; determine a first confidence level of the reading data based on the reading data; in response to a determination that the first confidence level is smaller than a confidence level threshold, obtain a working condition parameter; and determine, based on the working condition parameter, a gas meter correction mode.

In some embodiments, the smart gas device management platform 230 may be further configured to: predict, based on the first reading data, a distribution interval of third reading data and a distribution probability corresponding to the third reading data; and take a distribution probability corresponding to the second reading data in the distribution interval of the third reading data as the first confidence level.

In some embodiments, the smart gas device management platform 230 may be further configured to: determine, based on the first reading data sequence, a historical flow distribution condition; determine, based on the second reading data sequence, a current flow distribution condition; determine, based on a difference between the historical flow distribution condition and the current flow distribution condition, the first confidence level.

In some embodiments, the smart gas device management platform 230 may be further configured to: determine, based on the historical flow distribution condition and the current flow distribution condition, the first confidence level through a confidence level determination model. The confidence level determination model may be a machine learning model.

In some embodiments, the smart gas device management platform 230 may be further configured to: determine, based on the second reading data, a standard temperature and pressure, and a current temperature and pressure, a correction value of the second reading data through a reading data correction model. The reading data correction model may be a machine learning model.

For further descriptions on the smart gas device management platform 230, please refer to FIG. 3, FIG. 4, FIG. 5, FIG. 6, FIG. 7, and the related description thereof.

The smart gas sensor network platform 240 may refer to a platform for unified management of sensor communication between platforms of the IoT system 200. In some embodiments, the smart gas sensor network platform 240 may be configured as a communication network and a gateway. In some embodiments, the smart gas sensor network platform 240 may include a smart gas indoor device sensor network sub-platform and a smart gas pipeline network device sensor network sub-platform. The smart gas sensor network platform 240 may adopt a plurality of groups of gateway servers or a plurality of groups of intelligent routers, which are not limited here.

In some embodiments, the smart gas sensor network platform 240 may be configured for sensor communication of the smart gas indoor device and the smart gas pipeline network device. In some embodiments, the smart gas sensor network platform 240 may be configured to send the reading data to the smart gas data center. In some embodiments, the smart gas sensor network platform 240 may be configured to send the method for correcting a smart gas flow of the smart gas data center to the smart gas object platform 250.

The smart gas object platform 250 may be a functional device using gas. In some embodiments, the smart gas object platform 250 may be configured as a smart gas terminal, such as a gas use device, an intelligent gas meter, etc. The smart gas object platform 250 may obtain the reading data of the gas meter. In some embodiments, the smart gas object platform 250 may be configured as a monitoring device, such as a temperature sensor, a pressure sensor, a camera, a harmful gas monitoring device, etc. The smart gas object platform 250 may obtain the working condition parameter. In some embodiments, the smart gas object platform 250 may send the working condition parameter to the smart gas device management platform 230 through the smart gas sensor network platform 240. In some embodiments, the smart gas object platform 250 may include a smart gas indoor device object sub-platform and a smart gas pipeline network device object sub-platform. The smart gas indoor device object sub-platform may be configured as various gas terminals, such as a gas stove, a gas water heater, a gas meter, etc. The smart gas pipeline network device object sub-platform may be configured as a gas pipeline network pressure regulating device, etc.

In some embodiments of the present disclosure, through the above-mentioned IoT system, opposition between different types of data may be guaranteed, so as to ensure classified transmission, traceability of the data and classified issuance and processing of instructions, which can make the structure of the IoT and data processing clear and controllable, and facilitate the management, control and data processing of the IoT.

Figure 3:
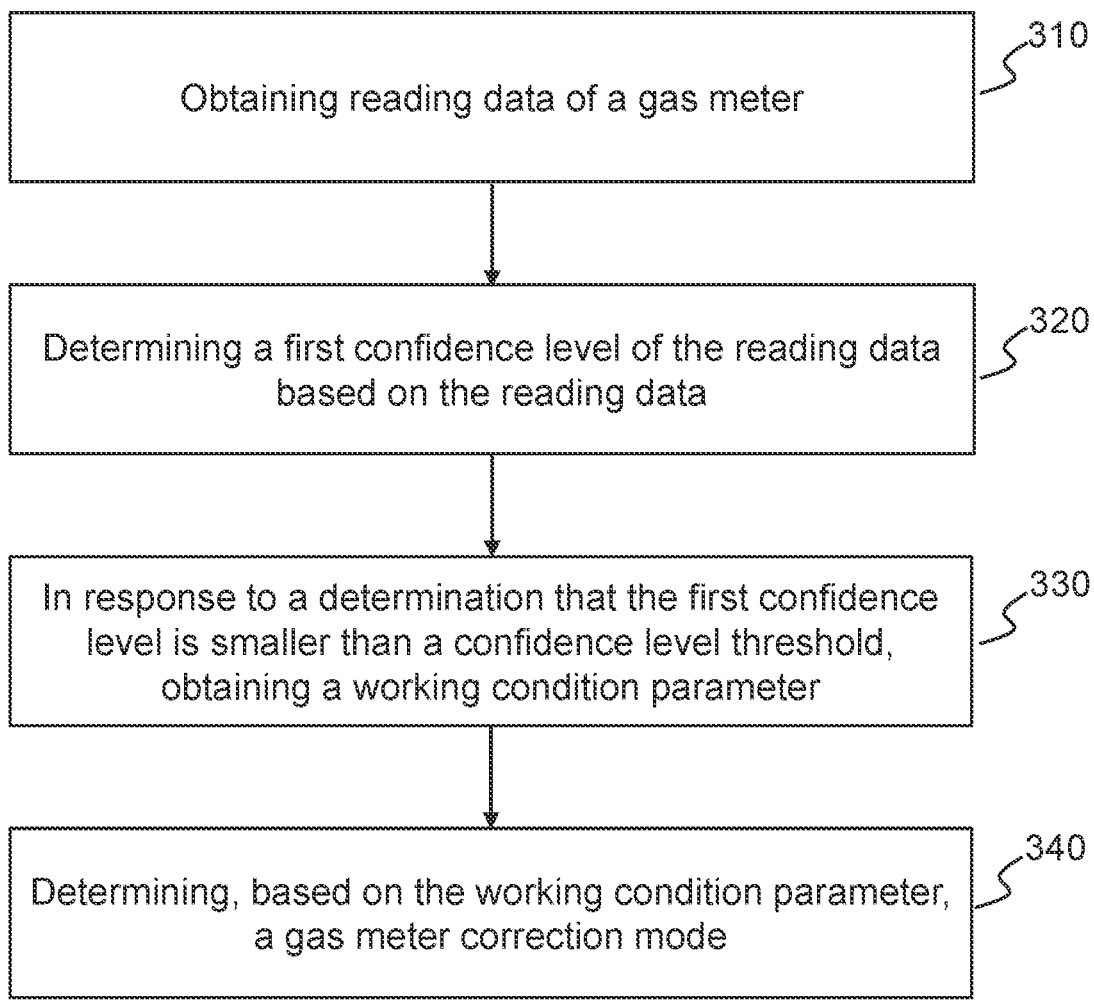
FIG. 3 is a flowchart illustrating an exemplary process of a method for correcting a smart gas flow according to some embodiments of the present disclosure.

FIG. 3 is a flowchart illustrating an exemplary process of a method for correcting a smart gas flow according to some embodiments of the present disclosure. In some embodiments, the process 300 may be executed by a smart gas device management platform of an IoT system for correcting a smart gas flow. As shown in FIG. 3, the process 300 may include the following operations.

In 310, obtaining reading data of a gas meter.

In some embodiments of the present disclosure, the reading data may be a gas flow count display value of the gas meter. The reading data may reflect information such as a gas flow, gas consumption, etc. For example, the reading data may be 168 $m^3$, indicating that a volume of gas passing through the gas meter (i.e., the volume of gas that has been used) is 168 $m^3$ since the gas meter starts metering.

In some embodiments, the smart gas device management platform may obtain at least one reading data through a smart gas object platform (such as a gas meter). The reading data may include current reading data and historical reading data. The current reading data may be the gas consumption from the time when the gas meter starts metering to a current time point. The historical reading data may be the gas consumption from the time when the gas meter starts metering to a certain historical settlement point. It may be understood that the gas meter is settled at an interval (such as a month), and a difference between the current reading data and the historical reading data may be taken as the gas consumption of a time period from the historical settlement point to the current time point.

In some embodiments, the historical reading data may be the gas consumption from the time when gas meter starts metering to other time points. For example, the historical reading data may be the gas consumption per hour since the gas meter starts metering.

In 320, determining a first confidence level of the reading data based on the reading data.

The first confidence level may indicate credibility of the reading data. As an actual working environment of the gas meter may affect the metering of the gas meter, the reading data of the gas meter may deviate from an actual gas flow. Therefore, the first confidence level may be taken as a parameter to measure accuracy of the reading data.

The first confidence level may be a specific numerical value within 10 or 100. For example, the first confidence level may be 90. The greater the first confidence level is, the closer the reading data of the gas meter may be to the actual gas flow (or gas consumption). The smaller the first confidence level is, the greater a difference between the reading data of the gas meter and the actual gas flow (or gas consumption) may be.

In some embodiments, the first confidence level may be obtained by performing a statistical analysis on a historical confidence level corresponding to the historical reading data. For example, the smart gas device management platform may determine the first confidence level through a point estimation manner based on the historical confidence level corresponding to the historical reading data. For further description regarding the above process, please refer to FIG. 4 and related description thereof.

In some embodiments, the first confidence level may be determined based on a difference between a historical flow distribution condition and a current flow distribution condition. For further description regarding determining the first confidence level based on the difference between the historical flow distribution condition and the current flow distribution condition, please refer to FIG. 5 and the related descriptions thereof.

In some embodiments, the first confidence level may be determined through an artificial intelligence model. For example, the smart gas device management platform may determine the first confidence level through a confidence level determination model. For specific description regarding the confidence level determination model, please refer to FIG. 6 and the related descriptions thereof.

In 330, in response to a determination that the first confidence level is smaller than a confidence level threshold, obtaining a working condition parameter.

The confidence level threshold may be a confidence level critical value for determining whether the reading data corresponding to the first confidence level needs to be corrected. The confidence level threshold may be determined empirically. For example, the confidence level threshold may be 90. When the first confidence level is smaller than 90, the smart gas device management platform may obtain the working condition parameter for a subsequent operation.

The working condition parameter may refer to a parameter involved in a real-time environment where the gas meter works. For example, the working condition parameter may include a temperature of the working environment of the gas meter, a gas pressure to which the gas meter is subjected, etc. In some embodiments, the working condition parameter may be determined by a device related to the gas meter. For example, the corresponding working condition parameter may be obtained through the temperature sensor 140-1, the pressure sensor 140-2, the camera, the harmful gas sensing device, etc. in the monitoring device 140.

In 340, determining, based on the working condition parameter, a gas meter correction manner.

The gas meter correction manner may refer to a measure taken on the gas meter to make up for the deviation of the reading data. For example, the gas meter correction manner may include reminding to replace the gas meter, using a spare gas meter, performing a correction calculation on the reading data of the gas meter, etc. An exemplary correction calculation may include a temperature compensation calculation, a pressure compensation calculation, etc.

In some embodiments, after the user replaces a new gas meter, the smart gas device management platform may continue to execute the method on the new gas meter. When the first confidence level corresponding to the reading data of the new gas meter is still smaller than the confidence level threshold, the smart gas device management platform may remind a supervision user to provide a door-to-door inspection for the gas meter.

In some embodiments, for a certain gas pipeline network, when the difference between the working condition parameter corresponding to a certain gas meter in the gas pipeline network and the working condition parameters corresponding to other gas meters in the gas pipeline network is greater than a difference threshold, the smart gas device management platform may determine the gas meter as a gas meter with suspected leakage, and may remind the supervision user to provide a door-to-door inspection for the gas meter. The difference threshold may be a manually preset value.

Through the method for correcting a smart gas flow described in some embodiments of the present disclosure, the accuracy of the reading data of the gas meter may be determined, and the gas meter with a relatively great deviation may be corrected. The entire determination process does not require a manual participation, thereby reducing an effect of subjective factors. In addition, the determination process is carried out based on the current reading data, the historical reading data and the working condition parameter of the gas meter, which can improve the correlation between the determination process and actual work of the gas meter.

FIG. 4 is a flowchart illustrating an exemplary process for determining a first confidence level according to some embodiments of the present disclosure. In some embodiments, the process 400 may be executed by a smart gas device management platform of an IoT system for correcting a smart gas flow. As shown in FIG. 4, the process 400 may include the following operations.

In 410, predicting, based on the first reading data, a distribution interval of third reading data and a distribution probability corresponding to the third reading data.

In some embodiments, the reading data may include first reading data and second reading data. The first reading data may be historical reading data of a gas meter. For example, the first reading data may be the reading data of the gas meter at a certain historical settlement point. For example, the reading data in January, 2010 is 25.56 $m^3$, and the reading data in February, 2010 is 47.88 $m^3$. In some embodiments, the first reading data may be determined by the gas meter, or may be determined by calling from a storage device, a network, etc. The second reading data may be the reading data of the gas meter at a current time point. For example, the second reading data may be a current display value of the gas meter of 51.22 $m^3$.

The third reading data may be a theoretical value of the current reading data. In some embodiments, the distribution interval of the third reading data and the first confidence level corresponding to the third reading data may be calculated by a statistical manner. For example, when a difference between the first reading data corresponding to adjacent historical settlement points subjects to a normal distribution with a mathematical expectation of p and a standard deviation of σ, the third reading data may be calculated through the following process.

In S1, calculating, based on the first reading data corresponding to each historical settlement point, the difference between the first reading data corresponding to the adjacent historical settlement points;

In S2, calculating, based on each difference and the first confidence level corresponding to each difference, the mathematical expectation μ and the standard deviation a to obtain the normal distribution N (μ, σ$^2$);

In S3, standardizing the normal distribution N (μ, σ$^2$);

In S4, checking, based on the current time point, a standard normal distribution table to obtain the third reading data and the confidence level corresponding to the third reading data.

Exemplarily, assuming that the current time point is February, 2020, the theoretical value of the current reading data may be calculated as follows.

In S1, adjacently subtracting the reading data of January, 2010 (confidence level of 90), the reading data of February, 2010 (confidence level of 92) . . . the reading data of January, 2020 (confidence level of 91) obtained by the gas meter to obtain a plurality of difference values (i.e., gas flow per month). Each difference may correspond to a confidence level (generally, the confidence level of the next month may be taken as the confidence level of the difference). For example, the difference of January, 2010 (i.e., the gas flow of the month) may be obtained by subtracting the reading data of January, 2010 from the reading data of February, 2010, and the confidence level corresponding to the reading data of February, 2010 may be taken as the confidence level of the difference.

In S2, calculating the mathematical expectation p and the standard deviation a based on each difference and confidence level corresponding to each difference to obtain the normal distribution N (μ, σ$^2$).

In S3, standardizing the normal distribution N (μ, σ$^2$) to obtain a standard normal distribution.

In S4, checking the standard normal distribution table to obtain the reading data corresponding to February, 2020 and the theoretical value of the confidence level corresponding to the reading data.

It should be noted that the difference between the first reading data corresponding to the adjacent historical settlement points subjects to the normal distribution only for illustration, and other statistical laws may also exist, such as a Poisson distribution, a geometric distribution, a binomial distribution, etc. The above statistical laws may be used to calculate the first confidence level, which is not repeated in the present disclosure.

In 420, taking a distribution probability corresponding to the second reading data in the distribution interval of the third reading data as the first confidence level. For example, when the second reading data is 40.20 m$^3$, the distribution probability corresponding to 40.20 m$^3$ in the third reading data may be taken as the first confidence level of the second reading data.

Through the method described in the embodiment, it is possible to find a statistical law from the historical reading data, and predict the first confidence level, so that the predicted first confidence level can be closer to the actual historical data.

Figure 5:
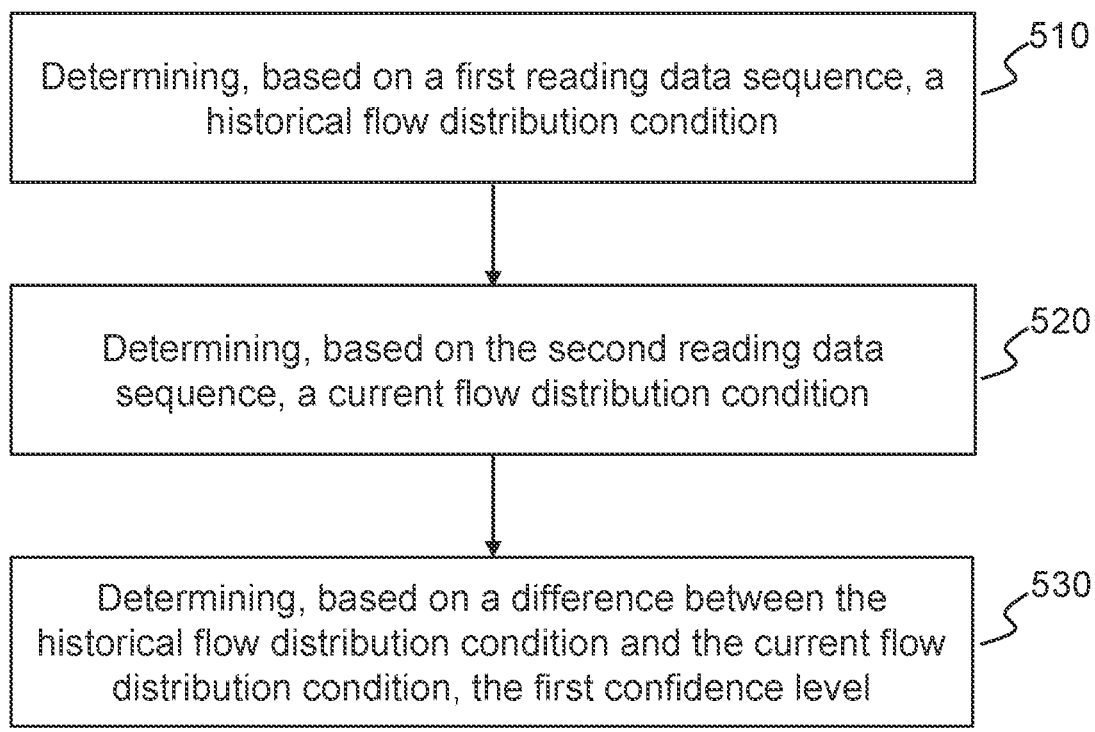
FIG. 5 is a flowchart illustrating an exemplary process for determining a first confidence level according to other embodiments of the present disclosure.

FIG. 5 is a flowchart illustrating an exemplary process for determining a first confidence level according to other embodiments of the present disclosure. In some embodiments, the process 500 may be executed by a smart gas device management platform of an IoT system for correcting a smart gas flow. As shown in FIG. 5, the process 500 may include the following operations.

In 510, determining, based on a first reading data sequence, a historical flow distribution condition.

In some embodiments, the reading data may include the first reading data sequence and a second reading data sequence. The first reading data sequence may be a data set composed of a plurality of first reading data. For example, for each hour in January, 2010, the corresponding first reading data sequence may be (20.00 m$^3$, 20.12 m$^3$, 20.45 m$^3$, . . . , 25.56 m$^3$). The above first reading data may be the reading data of the gas meter per hour in January, 2010.

In some embodiments, the smart gas device management platform may be configured to fit the first reading data sequence to obtain a time-reading data function p(x), and take the function p(x) as the historical flow distribution condition. An exemplary fitting manner may be to list the first reading data sequence as a point set in a time-reading data coordinate system, and connect the points with a smooth curve. An ordinate of the time-reading data function p(x) may be the reading data, and an abscissa may be the time point. An exemplary time-reading data function p(x) may be an exponential function, a power function, etc.

In 520, determining, based on the second reading data sequence, a current flow distribution condition.

The second reading data sequence may be a data set composed of a plurality of second reading data. For example, for each hour of the current day, the corresponding second reading data sequence may be (40.05 m$^3$, 40.14 m$^3$, 40.22 m$^3$, . . . , 40.25 m$^3$). The above second reading data may be the reading data of the gas meter per hour of the day of the current time.

In some embodiments, the smart gas device management platform may be configured to fit the second reading data sequence to obtain a time-reading data function q(x), and take the function q(x) as the current flow distribution condition. An exemplary fitting manner may be to list the second reading data sequence as a point set in a time-reading data coordinate system, and connect the points with a smooth curve. An ordinate of the time-reading data function q(x) may be the reading data, and an abscissa may be the time point. An exemplary time-reading data function q(x) may be an exponential function, a power function, etc.

In 530, determining, based on a difference between the historical flow distribution condition and the current flow distribution condition, the first confidence level.

It may be understood that, for a same user, the difference between the historical flow distribution condition and the current flow distribution condition may be smaller than a flow difference threshold. The flow difference threshold may be a preset value. For example, there is no great fluctuation in a count of family members, a count of gas devices, and a gas use duration of the same user. If the above difference is greater than the flow difference threshold, which may indicate that the first reading data sequence and the second reading data sequence do not meet a gas use law of the same user, the reading data may correspond to a relatively small first confidence level. If the above difference is smaller than the flow difference threshold, which may indicate that the first reading data sequence and the second reading data sequence meet the gas use law of the same user, the reading data may correspond to a relatively great first confidence level. The relatively small first confidence level may be a preset value, such as 0. The relatively great first confidence level may be a preset value, such as 90.

In some embodiments, the first confidence level may be determined by calculating a Kullback-Leibler divergence (KL divergence) of the time-reading data functions p(x) and q(x). An exemplary calculation equation is as follows.

$$M = \frac{1}{1 + e^{KL}},$$

where M denotes the first confidence level; KL denotes the KL divergence of p(x) and q(x).

In some embodiments, the smart gas device management platform may be configured to compare small flow data and large flow data of the historical flow distribution condition with small flow data and large flow data of the current flow distribution condition to determine the first confidence level.

For example, the reading data with flow increase less than 0.01 m³ per hour may be regarded as the small flow data, and the reading data with flow increase more than 1.5 m³ per hour may be regarded as the large flow data. Assuming that a ratio of the small flow data of the historical flow distribution condition to the small flow data of the current flow distribution condition is A, and a ratio of the large flow data of the historical flow distribution condition to the large flow data of the current flow distribution condition is B. By checking a preset relationship table between the A, B and the first confidence level, the first confidence level may be determined. The preset relationship table between the A, B and the first confidence level may include each ratio of A to B (such as 0.9, 1.0, 1.5, etc.) and the corresponding first confidence levels (such as 90, 100, 60, etc.). It may be understood that the ratio of A to B is closer to 1, A is closer to B, and the first confidence level is greater. The relationship table between the A, B and the first confidence level may be determined empirically.

In the embodiments of the present disclosure, by analyzing the curve fitted by the historical reading data and the current reading data, the first confidence level conforming to the gas use law of the user may be obtained, so that the predicted first confidence level can be more accurate.

Figure 6:
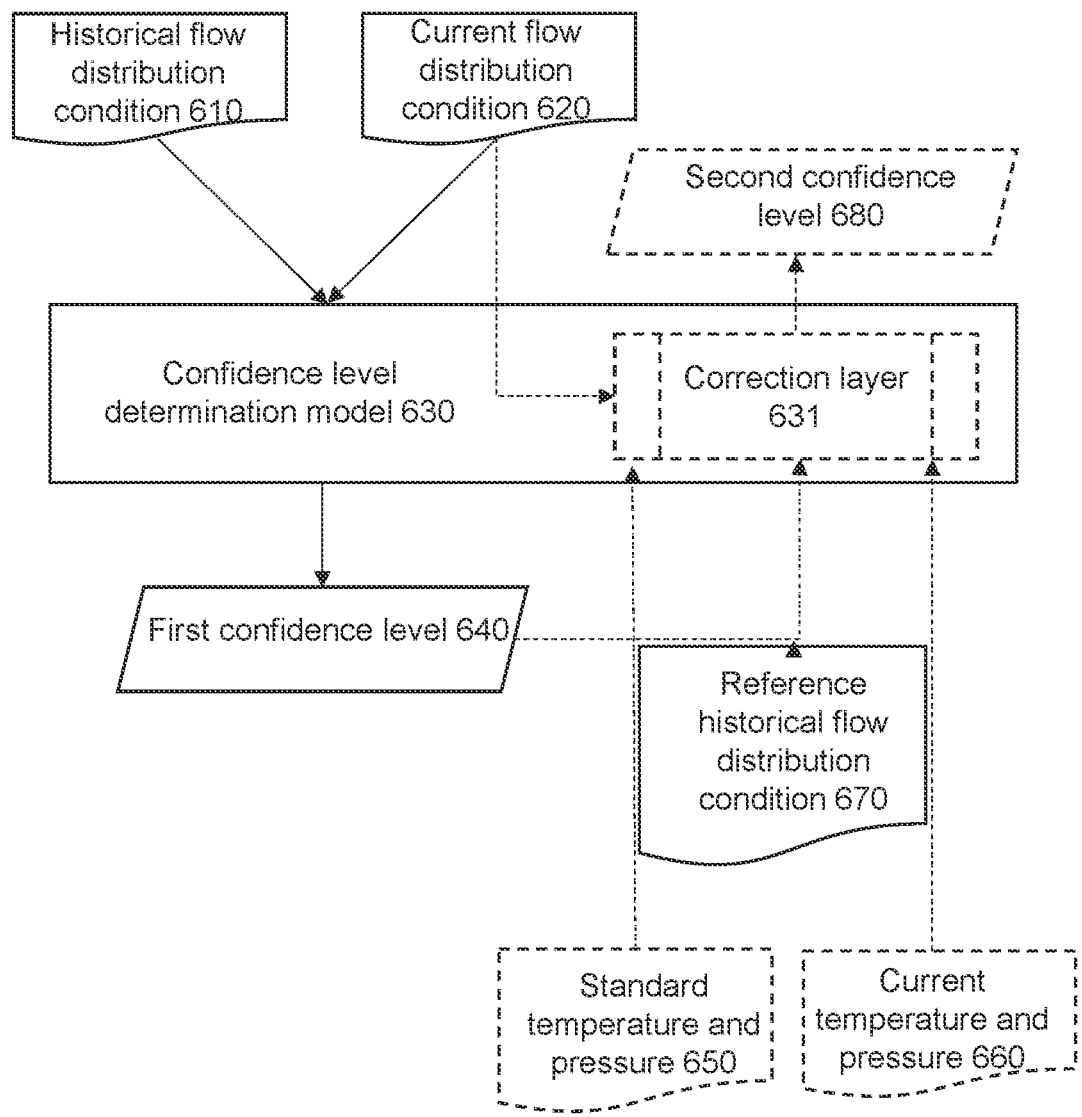
FIG. 6 is a structural diagram illustrating an exemplary confidence level determination model according to some embodiments of the present disclosure.

FIG. 6 is a structural diagram illustrating an exemplary confidence level determination model according to some embodiments of the present disclosure.

In some embodiments, a smart gas device management platform may determine a first confidence level through a confidence degree determination model based on a historical flow distribution condition and a current flow distribution condition. The confidence level determination model may be a machine learning model, for example, a neural network model. As shown in FIG. 6, an input of the confidence level determination model 630 may include the historical flow distribution condition 610 and the current flow distribution condition 620. An output of the confidence level determination model 630 may include the first confidence level 640. For the historical flow distribution condition 610 and the current flow distribution condition 620, please refer to FIG. 5 and the related description thereof.

In some embodiments, the confidence level determination model 630 may be obtained by training a great number of training samples with labels. Specifically, a plurality of groups of training samples with labels may be input into an initial confidence level determination model, a loss function may be constructed based on an output of the initial confidence level determination model and the labels, and parameters of the confidence level determination model may be iteratively updated through training based on the loss function. In some embodiments, the training may be performed by various modes based on the training samples. For example, the training may be performed based on a gradient descent. When a preset condition is met, the training may end and a trained confidence level determination model may be obtained. The preset condition may be that the loss function converges.

In some embodiments, the training sample may include the historical flow distribution condition and a randomly generated reading to be predicted. The label may be a first confidence level corresponding to the randomly generated reading to be predicted. The training sample may be determined by calling information stored in a storage device. The label may be obtained by manual labeling. In some embodiments, the training sample may further include the historical flow distribution condition and corrected actual reading data of the gas meter.

In some embodiments, the confidence level determination model 630 may further include a correction layer 631. An input of the correction layer 631 may include the first confidence level 640, a reference historical flow distribution condition 670, and the current flow distribution condition 620. An output of the correction layer 631 may include a second confidence level 680. For the first confidence level 640, please refer to FIG. 3 and the related description thereof. For the current flow distribution condition 620, please refer to FIG. 5 and the related description thereof.

The reference historical flow distribution condition may refer to a first reading data sequence of a gas meter of a reference user. The reference user may be determined through manual selection. In some embodiments, the reference user may be a user whose normal distribution relationship is similar to the current user. For example, when a difference between the first reading data corresponding to the adjacent historical settlement points of the current user subjects to the normal distribution with a mathematical expectation of μ and a standard deviation of σ, and the first reading data corresponding to the adjacent historical settlement points of a certain user subjects to or is similar to the above-mentioned normal distribution, the user may be regarded as the reference user. The reference historical flow distribution condition may be a historical reading data sequence under a standard condition (such as a standard working condition parameter condition), or a historical reading data sequence corrected by the gas meter.

The second confidence level may be a corrected first confidence level.

In some embodiments, the correction layer 631 may be obtained by training a great number of training samples with labels. Specifically, a plurality of groups of training samples with labels may be input into an initial correction layer, a loss function may be constructed based on an output of the initial correction layer and the labels, and parameters of the correction layer may be iteratively updated through training based on the loss function.

In some embodiments, the training may be performed by various modes based on the training samples. For example, the training may be performed based on a gradient descent. When a preset condition is met, the training may end and a trained correction layer may be obtained. The preset condition may be that the loss function converges.

In some embodiments, the training sample may include a historical first confidence level, the historical flow distribution condition, and the reference historical flow distribution condition. The label may be a historical second confidence level (that is, the historically corrected first confidence level). The training sample may be determined by calling the information stored in the storage device. The label may be obtained by manual labeling.

In some embodiments, the input of the correction layer 631 may further include a standard temperature and pressure 650 and a current temperature and pressure 660. The standard temperature and pressure may be a recommended temperature and pressure used by the gas meter. The standard temperature and pressure may be a specific temperature range and/or pressure range. In some embodiments, the standard temperature and pressure may be determined through factory setting of the gas meter. The current temperature and pressure may be the temperature and pressure of an actual working environment of the gas meter. In some embodiments, the current temperature and pressure may be determined by the working condition parameter. The greater a difference between the standard temperature and pressure and the current temperature and pressure is, the worse the working condition of the gas meter may be, and the lower the confidence level of the gas meter reading data may be. For example, when the current temperature is -20° C., an error may occur to the gas meter due to moisture freezing in the gas.

In the embodiment of the present disclosure, by introducing reading data of other users with similar gas use habits into the artificial intelligence model, as well as the temperature and pressure parameter of the actual working condition of the gas meter, a count of impact factors of the confidence level may be increased. After being corrected by the correction layer, the first confidence level that is more in line with the actual condition can be obtained.

Figure 7:
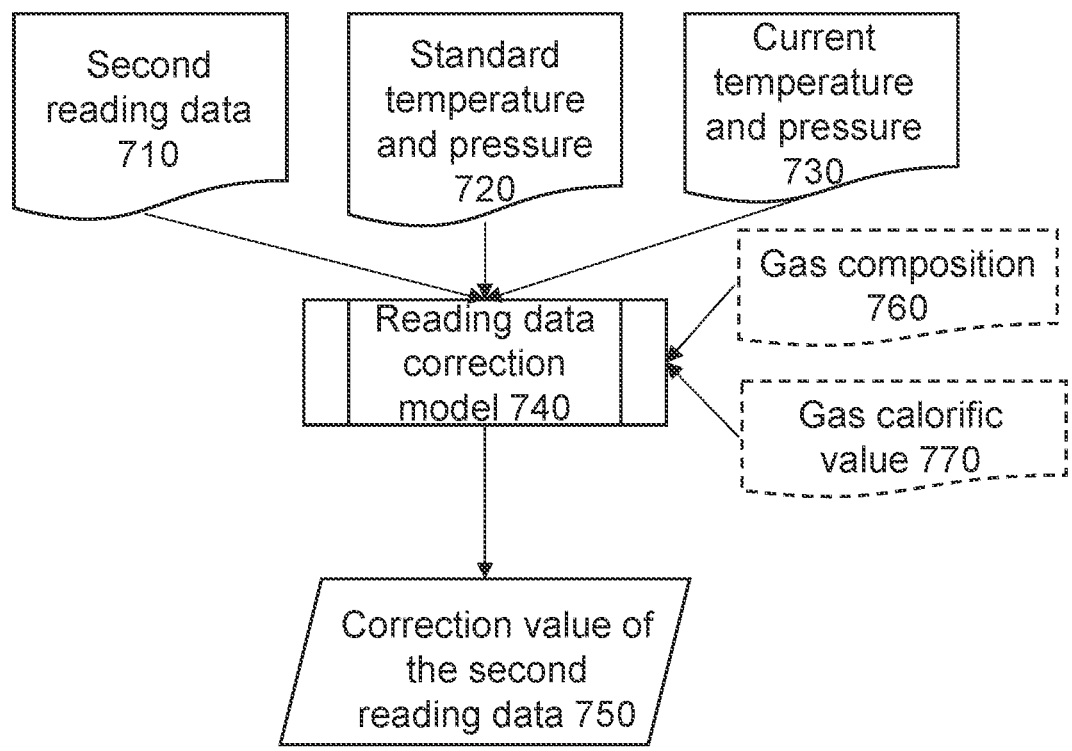
FIG. 7 is a structural diagram illustrating an exemplary reading data correction model according to some embodiments of the present disclosure.

FIG. 7 is a structural diagram illustrating an exemplary reading data correction model according to some embodiments of the present disclosure.

In some embodiments, a working condition parameter may include a standard temperature and pressure and a current temperature and pressure. In some embodiments, the smart gas device management platform may determine, based on second reading data, the standard temperature and pressure, and the current temperature and pressure, a correction value of second reading data through the reading data correction model. The reading data correction model may be a machine learning model, for example, a neural network model. As shown in FIG. 7, an input of the reading data correction model 740 may include the second reading data 710, the standard temperature and pressure 720 and the current temperature and pressure 730. An output of the reading data correction model 740 may include a correction value 750 of the second reading data. For the second reading data 710, please refer to FIG. 4 and the related description thereof. For the standard temperature and pressure 720 and the current temperature and pressure 730, please refer to FIG. 6 and the related description thereof.

In some embodiments, the reading data correction model 740 may be obtained by training a great number of training samples with labels. Specifically, a plurality of groups of training samples with labels may be input to an initial reading data correction model, a loss function may be constructed based on an output of the initial reading data correction model and the labels, and parameters of the reading data correction model may be iteratively updated through training based on the loss function.

In some embodiments, the training may be performed by various modes based on the training samples. For example, the training may be performed based on a gradient descent. When a preset condition is met, the training may end and a trained reading data correction model may be obtained. The preset condition may be that the loss function converges.

In some embodiments, the training sample may include historical reading data, the standard temperature and pressure, and a historical temperature and pressure. The label may be a correction value of the historical reading data. The training sample may be determined by calling information stored in a storage device. The label may be obtained by manual labeling.

In some embodiments, the input of the reading data correction model 740 may further include a gas composition 760 and a gas calorific value 770. Wear and corrosion of the gas meter caused by gas may affect the reading data of the gas meter. For example, when the gas contains acid gas, a degree of corrosion of the gas meter caused by the gas may increase, which may accordingly increase an error of the reading data of the gas meter and reduce the first confidence level. In some embodiments, the gas composition and the gas calorific value may be determined by a gas supplier. The gas composition and the gas calorific value may be used as the input, which may take into account an impact of the gas on the reading data of the gas meter, thereby improving accuracy of the output reading data.

In some embodiments, the smart gas device management platform may determine the confidence level corresponding to the output correction value of the second reading data. For specific description on determining the confidence level, please refer to FIG. 4, FIG. 5 and FIG. 6 and the specific description thereof. In some embodiments, when the confidence level corresponding to the correction value of the second reading data is greater than a confidence level threshold, the smart gas device management platform may determine the confidence level as the first confidence level, and determine the correction value of the second reading data as a final second reading data.

In some embodiments of the present disclosure, the current reading data of the gas meter may be corrected through the actual working condition parameter of the gas meter and the information of the gas, so as to improve a matching degree between the predicted reading data and the actual gas flow, and obtain reading data that is more in line with the actual condition.

The present disclosure provides a non-transitory computer-readable storage medium storing computer instructions. When reading the computer instructions in the storage medium, a computer may implement the method for correcting a smart gas flow.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for correcting a smart gas flow, implemented by a smart gas device management platform of an Internet of Things (I) system for correcting a smart gas flow, comprising:
    obtaining reading data of a gas meter;
    determining a first confidence level of the reading data based on the reading data; wherein the reading data includes first reading data and second reading data, the first reading data being historical reading data of the gas meter, the second reading data being current reading data corresponding to a current time point, and the determining a first confidence level of the reading data based on the reading data comprising:
        predicting, based on the first reading data, a distribution interval of third reading data and a distribution probability corresponding to the third reading data; the third reading data being a theoretical value of the current reading data, and the current reading data being a gas consumption from time when the gas meter starts metering to the current time point; and
        taking a distribution probability corresponding to the second reading data in the distribution interval of the third reading data as the first confidence level;
    in response to a determination that the first confidence level is smaller than a confidence level threshold, obtaining a working condition parameter; the confidence level threshold being determined through an experience value; and
    determining, based on the working condition parameter, a gas meter correction manner; the working condition parameter including a standard temperature and pressure and a current temperature and pressure, and the determining, based on the working condition parameter, a gas meter correction manner comprising:
        determining, based on the second reading data, the standard temperature and pressure, and the current temperature and pressure, a correction value of the second reading data through a reading data correction model, wherein the reading data correction model is a machine learning model.

2. The method of claim 1, wherein the reading data includes a first reading data sequence and a second reading data sequence, and the determining a first confidence level of the reading data based on the reading data comprises:
    determining, based on the first reading data sequence, a historical flow distribution condition;
    determining, based on the second reading data sequence, a current flow distribution condition; and
    determining, based on a difference between the historical flow distribution condition and the current flow distribution condition, the first confidence level.

3. The method of claim 1, wherein the determining a first confidence level of the reading data based on the reading data comprises:
    determining, based on the historical flow distribution condition and the current flow distribution condition, the first confidence level through a confidence level determination model, wherein the confidence level determination model is a machine learning model.

4. The method of claim 3, wherein the confidence level determination model further includes a correction layer, and an input of the correction layer includes the first confidence level, a reference historical flow distribution condition, and the current flow distribution condition, and an output of the correction layer includes a second confidence level.

5. The method of claim 1, wherein an input of the reading data correction model further includes a gas composition and a gas calorific value.

6. An Internet of Things (IoT) system for correcting a smart gas flow, wherein the system includes a user platform, a service platform, a management platform, a sensor network platform, and an object platform, wherein the management platform is configured to:
  obtain reading data of a gas meter;
  determine a first confidence level of the reading data based on the reading data; wherein the reading data includes first reading data and second reading data, the first reading data being historical reading data of the gas meter, and the second reading data being current reading data corresponding to a current time point, and to determine a first confidence level of the reading data based on the reading data, the management platform is further configured to:
    predict, based on the first reading data, a distribution interval of third reading data and a distribution probability corresponding to the third reading data; the third reading data being a theoretical value of the current reading data, and the current reading data being a gas consumption from time when the gas meter starts metering to the current time point; and
    take a distribution probability corresponding to the second reading data in the distribution interval of the third reading data as the first confidence level;
  in response to a determination that the first confidence level is smaller than a confidence level threshold, obtain a working condition parameter; the confidence level threshold being determined through an experience value; and
  determine, based on the working condition parameter, a gas meter correction manner; the working condition parameter including a standard temperature and pressure and a current temperature and pressure, and to determine, based on the working condition parameter, a gas meter correction manner, the management platform is further configured to:
  determine, based on second reading data, the standard temperature and pressure, and the current temperature and pressure, a correction value of the second reading data through a reading data correction model, wherein the reading data correction model is a machine learning model.

7. A non-transitory computer-readable storage medium storing computer instructions, wherein when reading the computer instructions in the storage medium, a computer implements the method of claim 1.

* * * * *